Jan. 23, 1945. A. J. ENGLAND 2,368,011
DEVICE FOR RELIEVING CUTTERS
Filed July 15, 1942
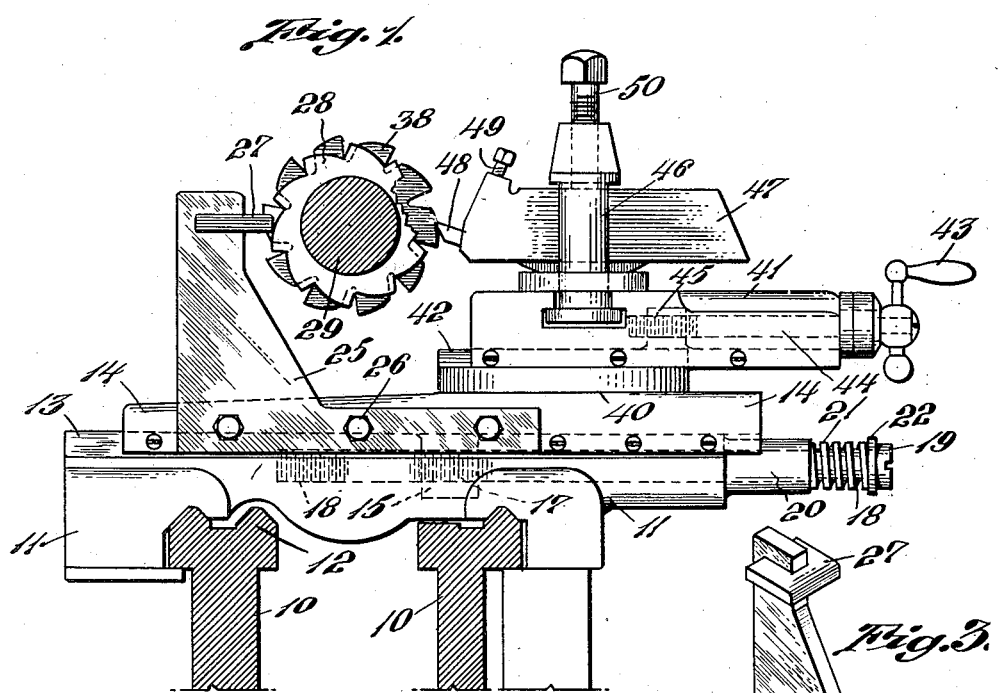
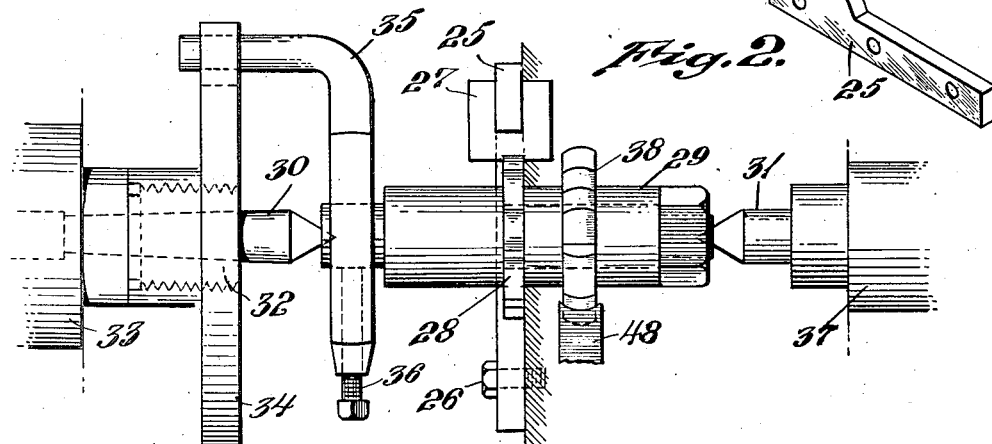
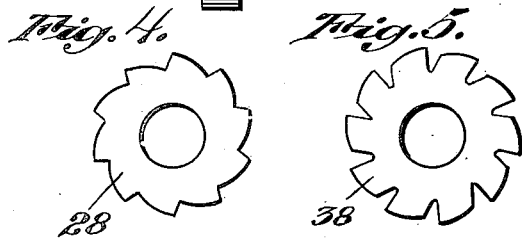
INVENTOR
August J. England
BY Barlow & Barlow
ATTORNEYS Patented Jan. 23, 1945

2,368,011

UNITED STATES PATENT OFFICE 2,368,011

DEVICE FOR RELIEVING CUTTERS

August J. England, Providence, R. I.

Application July 15, 1942, Serial No. 451,018

2 Claims. (Cl. 82—19)

This invention relates to a device for backing off the teeth of cutters, or a relieving of the cutting teeth of cutters.

In backing off the teeth of cutters it has been usual to perform this operation on a special backing-off lathe attachment.

One of the objects of this invention is to provide a simple, mechanical arrangement which may be utilized for relieving or backing off cutters.

Another object of this invention is to provide an attachment for a lathe which will enable cutters to be backed off or relieved satisfactorily.

Another object of this invention is to provide an arrangement whereby, with simple additions and changes, the mechanism usual on a lathe may be transformed into a device for relieving the cutting teeth of cutters or backing off cutters, as it is sometimes termed.

With these and other objects in view, the invention consists of certain novel features of construction, as will be more fully described and particularly pointed out in the appended claims.

In the accompanying drawing:

Fig. 1 is a sectional view taken laterally of a lathe and illustrating the parts thereof modified to incorporate the present invention;

Fig. 2 is a top plan view of a fragmental portion of the parts shown in Fig. 1;

Fig. 3 is a perspective view of a fragmental portion of the arm which is attached to the cross slide of the lathe;

Fig. 4 is a side view of the cam; and

Fig. 5 is a side view of the work which is performed upon the device.

In proceeding with this invention I have modified the usual cross slide of a lathe by adding an arm thereto with a cam follower and so arranging the usual adjustment of the cross slide that a spring urges the slide in a direction to cause the follower to engage a cam and be governed by the shape of the cam. An arbor is mounted in the lathe between the head stock and tail stock and the controlling cam and work are mounted on the arbor. The remaining mechanism of the lathe is standard equipment.

With reference to the drawing, in Fig. 1 at 10 there is illustrated in cross section, the bed of the lathe upon which the usual carriage 11 is positioned which will slide longitudinally of the lathe along the guide 12. However, in the present instance, the carriage is firmly locked in position on the bed 10. The carriage has provided thereon a dovetail guide 13 which directs the lateral movement across the lathe of the cross slide 14. The dovetail guide has a central slot through which the boss shown in dotted lines at 15 extends, which boss is threaded as at 17 for the reception of the shaft 18. The shaft extends through the collar 20 which is fixed to the carriage 11 and is provided with a head 19.

This shaft 18 usually has mounted thereon a handle for rotating the same, together with a collar and dial, but these have all been removed and replaced by a spring 21 which acts against a washer 22 just inwardly of the head 19 while pressing on collar 20 to urge the cross slide 14 toward the right as shown in Fig. 1 along its guide 13. As illustrated, the shaft 18 which formerly rotated now is only rotated for adjustment of the tension of the spring 21, and after this tension is adjusted to a suitable amount, the shaft moves with the cross slide as if a fixed part thereof.

Attached to the cross slide there is a bracket-like arm 25 (see Fig. 3) bolted to the side of the cross slide as at 26. This arm extends upward and carries a cam follower 27 for engagement with a cam 28.

The cam 28 is mounted on an arbor 29 which is positioned between the live center 30 and the dead center 31. The live center is mounted in a usual manner in a spindle 32 which is provided with a face plate 34 all driven by the head stock 33. A dog 35 engages the face plate and is clamped to the arbor by means of a set screw 36. The dead center is mounted in the tail stock 37 in a usual manner. The detail of the head and tail stock of the lathe are not here illustrated. The work or cutter 38 is mounted on the arbor 29 as is also the cam 28 which is to govern the movement of the tool for operating upon the work.

The cross slide 14 has mounted thereon a member 40 which may be adjusted swivelly on the cross slide, and upon this member the compound slide 41 is secured for movement along the dovetail guide 42 by reason of the handle 43 turning the threaded shaft 44 which is threaded into the boss 45 fixed to the member 40. Thus by turning a handle 43 the compound slide 41 may be moved inwardly or outwardly with reference to the arbor. The compound slide has mounted therein in a usual manner the tool post 46 and the tool holder 47 with a tool 48. Suitable binding means 49 and 50 are provided in a usual manner.

In operation I will mount the work on the arbor and then mount a cam 28 upon the arbor 29 in the reverse direction of the cutter which I desire to back off. Rotation of the head stock is commenced and, as will be apparent, the follower 27 is drawn into engagement with the cam 28 by means of the spring 21. The tool 48 is adjusted by means of the handle 43 to take the proper depth cut and then as rotation occurs the cross slide is moved in and out in response to the cam to cause the cutter to advance toward or move from the arbor to back off each of the teeth of the cutter 38. As the operation occurs the tool may be fed inwardly by the handle 43 from time to time after a complete revolution of the arbor has been made one or more times until the proper amount of backing off of each of the teeth is accomplished.

By the arrangement of the cam follower 27 on one side of the arbor and the cutting tool 48 on the other side of the arbor at substantially diametrically opposite points, should there be any spring in the arbor inasmuch as these two parts 27 and 48 move together, no irregularity because of the spring of the arbor will occur in the work. Furthermore by the arrangement of the follower on one side of the arbor and the cutting tool on the other side of the arbor a better balanced arrangement of the pressure is provided and a more smooth and even cut is obtained.

The arrangement provides for a very simple and effective means of arranging a lathe to perform the result of the far more complicated backing-off lathe attachment which has heretofore been usual for the provision of backing off of cutters.

I claim:

1. Means for the conversion of a lathe, having an arbor driven from the spindle with a cutter to be relieved on said arbor, and a pattern plate coaxial therewith and a carriage having a cross-slide thereon with a shaft to adjust the cross-slide relative to the carriage, to a machine for relieving a cutter, comprising a bracket attached to said cross-slide and provided with a follower at a location to engage said pattern plate and resilient means associated with said shaft and acting between said cross-slide and carriage to move said cross-slide to cause said follower to press upon said pattern plate.

2. Means for the conversion of a lathe, having an arbor driven from the spindle with a cutter to be relieved on said arbor, and a pattern plate coaxial therewith and a carriage having a cross-slide thereon with a shaft to adjust the cross-slide relative to the carriage, to a machine for relieving a cutter, comprising an L-shaped upwardly extending bracket attached to said cross-slide and provided with a follower at a location to engage said pattern plate and a spring encircling said shaft and acting between said cross-slide and carriage to move said cross-slide to cause said follower to press upon said pattern plate.

AUGUST J. ENGLAND.